Nov. 30, 1965   H. D. CRANDON   3,221,083
OPTICAL ELEMENTS FORMED OF RESINOUS MATERIALS
AND PROCESS FOR MAKING THE SAME
Filed Aug. 18, 1960
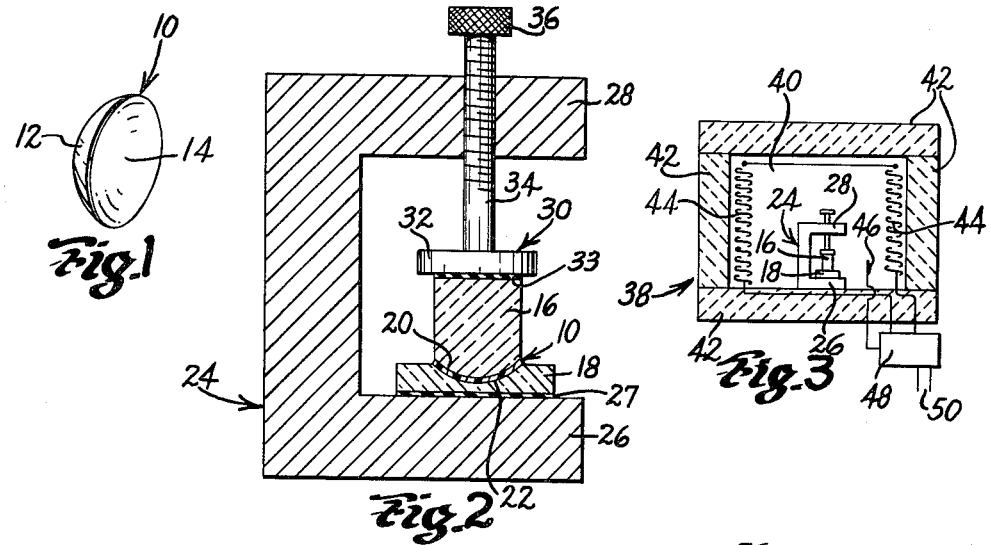
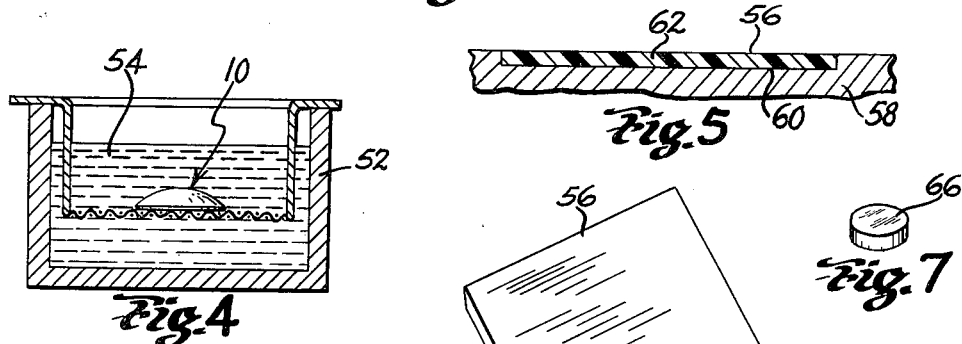
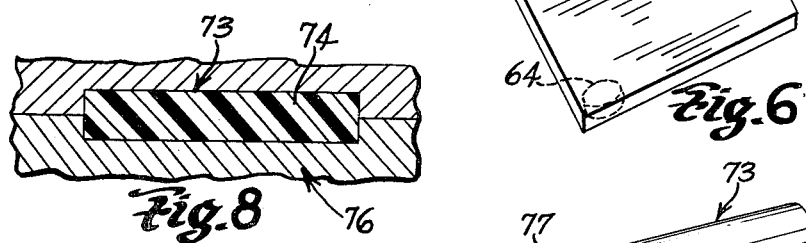
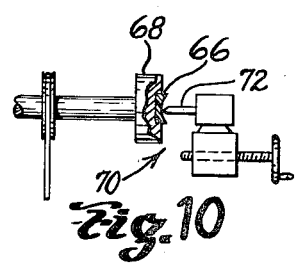
INVENTOR
HARRY D. CRANDON
BY
Louis L. Gagnon
ATTORNEY 3,221,083
OPTICAL ELEMENTS FORMED OF RESINOUS MATERIALS AND PROCESS FOR MAKING THE SAME
Harry D. Crandon, Woodstock, Conn., assignor to American Optical Company, Southbridge, Mass., a voluntary association of Massachusetts
Filed Aug. 18, 1960, Ser. No. 50,505
12 Claims. (Cl. 264—1)

This invention relates to improvements in optical elements formed of resinous materials and has particular reference to a process for making optical lenses or the like having hydrophilic surfaces which are of dependable stability and highly scratch-resistant.

Optical elements such as contact lenses which are worn upon the eyes should, for maximum comfort and safety, have a relatively strong affinity for water or like fluids so as to be readily wettable by the eye secretions when in use. Furthermore, the lenses should, among other things, have dependable stability and be relatively scratch-resistant. These latter qualifications have, heretofore, been met with some measure of success but, in striving for hardness and dimensional stability, present-day lenses have become relatively hydrophobic and tend to cause a drying effect which, after relatively short periods of use, causes irritation of the eyes with the result that frequent removal is necessary for soaking with a view to obtaining some measure of wetting. Continual use of drying lenses subject the corneal or other eye tissues to damage which may require extended periods of non-use of the lenses to permit regeneration and repair of the tissues.

Therefore, it can be seen that, ideally, contact lenses should be hydrophilic, dependable as to dimensional and physical stability, highly scratch-resistant and of high optical quality.

The present invention provides for all of the above-mentioned desires in the contact lens field and it is, accordingly, a principal object to provide a process for making optical elements which are physically and geometrically stable, relatively scratch-resistant and hydrophilic.

Another object is to provide a process for making optical elements of the above character which offers an assurance of predetermined quality with high precision of duplication.

Another object is to provide by a casting technique, substantially stress and strain-free articles of manufacture having fixed control of surface quality, shape and dimension in accordance with the respective similar characteristics of the casting mold surfaces.

Another object is to provide by the above process an article which is dependably stable as to hardness and physical and optical characteristics yet readily surface hydrolyzable to permit the rendering of its surfaces hydrophilic.

A further object is to provide, in accordance with the above, a surface-hydrolyzed article formed of copolymerized resinous materials, at least one of which is a vinyl-type monomer containing hydrophilic hydroxyl, carboxyl or epoxide groups that open to hydroxyl groups in hydrolysis.

A still further object is to provide a unique, simple, inexpensive and highly efficient process for making optical elements of the above character.

Other objects and advantages of the invention will become apparent from the following description when taken in conjunction with the accompanying drawings in which:

FIG. 1 is an enlarged perspective view of one type of optical element which may be manufactured in accordance with this invention;

FIG. 2 is a diagrammatic vertical cross-sectional view of a preferred form of apparatus used to carry out a part of the process of the invention:

FIG. 3 is a diagrammatic cross-sectional view of heating means for accomplishing another step in the process of the invention; and FIG. 4 is a diagrammatic vertical cross-sectional view of means for carrying out a final step of the invention.

In the manufacture of optical elements such as contact lenses, particularly of the corneal type, dimensional stability and precise duplication of the lenses is of extreme importance. That, is, the uniqueness of a patent's requirements must be dealt with without variability in lenses in order for contact lens fitting to become less of an art and more of a science. In cases of lost lenses wherein replacement of a lost lens or pair thereof is necessary, a precise duplicating process of making lenses has extreme advantage particularly since, with wearing, an intimate relationship between the cornea and lens posterior side results from the cornea tending to assume the lens shape. Specific lens requirements are, in such cases, necessary for successful refitting.

Casting techniques inherently produce substantially stress and strain-free articles and for this, among other reasons, such techniques lead to more successful control of dimensional stability in contact lens manufacture. Furthermore, since casting is inherently a duplicating process giving an assurance of repeated fixed surface shape and quality, in accordance with the shape and quality of mold surfaces used, this invention relates more particularly to the process of directly casting corneal contact lenses or like articles to the shapes desired or alternatively casting substantially stress and strain free sheet or rod stock of resinous materials which are characterized in the manner to be described hereinafter and from which substantially stress and strain free lenses or like articles may be turned, cut or otherwise formed.

It is pointed out, however, that while the present invention is concerned with the physical and optical stability of articles of manufacture, it also provides for the manufacture of optical elements having hydrophilic surfaces. Thus, all optical elements which are intended to be immersed or wetted by fluids are not to be excluded.

Referring more particularly to the drawings, it will be seen that FIG. 1 shows an enlarged view of a corneal-type contact lens 10 having an anterior surface 12 and a posterior surface 14. In practice, the posterior surface 14 is shaped in accordance with the particular apical and para-apical cornea curvatures with which it is to be used. The curvature of the surface 14 which is usually referred to as the base or corneal curvature may be either a bi-curve construction or single spherical curve or of any other shape in accordance with the different known practices used in fitting lenses of this type. The anterior surface 12 of a finished lens 10 usually carries a curvature which is calculated in accordance with the base curve on the surface 14 to provide the user with his required visual correction.

Lenses of the above type may be cast to specific prescribed curvatures on both sides or supplied to practitioners in the field with substantially parallel opposite side surfaces with specified base curves on the posterior side wherein the curve on the anterior surface 12 is subsequently turned and polished and/or otherwise optically finished to meet the visual correction requirements of the recipient.

In any case, the lens 10 is initially cast, in accordance with a preferred method of fabrication by providing a pair of mold halves 16 and 18 having the respective curvatures 20 and 22 matching those desired of the respective surfaces 12 and 14 of the resultant lens 10. The mold halves 16 and 18 are disposed coaxially in a support 24 with the centers of curvature of the surfaces 20 and 22 disposed along the said common axis.

While various types of more elaborate casting devices than that shown in FIG. 2 may be used, the arrangement of FIG. 2, which is shown for purposes of illustration only, embodies a base portion 26 upon which the mold half 18 is attached by cement 27 or other known holding means and a holder 30 for the upper mold half 16 is suspended from an overhanging section 28 of the support 24.

The holder 30 embodies a platen 32 to which the upper mold half 16 is attached with cement 33 or the like. Integral with the platen 32 is a vertically extending screw part 34 which threads through the section 28 and is provided with a knurled finger grip 36 which, by rotation, will raise or lower the platen 32 and its attached mold half 16 to provide a desired spacing between the respective adjacent surfaces 20 and 22 of the mold halves in accordance with the thickness desired of the lens 10 to be cast therebetween.

The casting of the lens 10 is accomplished by inserting the initially flowable resinous material between the spaced mold halves as illustrated (FIG. 2) and curing the material by the application of heat of controlled amounts and for predetermined time periods selected in accordance with the characteristics of the resinous material as will be described in detail hereinafter.

Referring to FIG. 3, it will be seen that to accomplish the curing of the cast lens 10, the entire assembly of apparatus shown in FIG. 2 is placed within a curing furnace 38 having an enclosed heating chamber 40 formed by surrounding refractory or other heat-insulating wall parts 42. The heating of the chamber 40 is accomplished by means of suitable electrical heating coils 44 or the like placed therein and which are electrically operably connected to a heat control arrangement embodying a thermocouple or the like 46 within the chamber 40 and suitable control means 48 (shown by block diagram) which is, in turn, connected to a source of current 50.

The above-mentioned alternate methods of forming lenses 10, such as shown in FIG. 1, are illustrated diagrammatically in FIGS. 5–10. In FIGS. 5, 6, 7 and 10, it can be seen that the making of a lens 10 from cast sheet stock 56 is accomplished by providing a mold member 58 formed of glass or a suitable metal such as stainless steel or the like having a cavity 60 therein of a size and shape substantially equal to that of the desired sheet 56 to be formed therefrom. An initially fluid resinous material preferably of the type which is to be described in detail hereinafter is placed in the cavity 60 and cured by the placement of the mold member along with the material 62 therein in a suitable heating furnace 38 or the like such as shown in FIG. 3. Upon complete polymerization of the resinous material 62, the sheet 56 thereof is removed from the furnace, cooled and cut as shown by dot-dash outline 64 (FIG. 6) to form buttons 66 (see FIG. 7), of the diametrical size required to turn the buttons 66 to a desired final lens shape. The turning of the buttons 66 is preferably accomplished by placing the same in the chuck part 68 of a suitable jeweler's-type lathe 70 or the like such as shown diagrammatically in FIG. 10 wherein, with a cutting tool 72, the surface curvatures of the lenses are cut to the size and shape desired in conventional manner. Optical finishing by abrading and/or polishing of the turned surfaces is then accomplished by applying a suitable known polishing compound such as zinc oxide or the like to the turned lenses while the lenses are held and rotated in the chuck 68 or in another similar holding device.

Buttons such as 66 may also be formed from rod stock as shown in FIGS. 8 and 9 wherein a rod 73 of resinous material 74 is cast to a desired diametrical size in a mold member 76 (see FIG. 8) and subsequently cured in a furnace 38 such as shown in FIG. 3. After curing and cooling the rod 73 is cut transversely as shown in FIG. 9 to form buttons 77 of the thickness required to produce the final lens shape by turning as shown and described with relation to FIG. 10.

As discussed above, the invention relates to the forming of lenses 10 which ultimately embody hydrophilic surfaces and are of superior optical quality and dimensional stability. This is accomplished by forming the resinous lens material of a composition whose major ingredient is allyldiglycolcarbonate. Allyldiglycolcarbonate is well known to the trade as CR39 and will be referred to as such hereinafter.

While CR39, when cured, is highly scratch-resistant, dimensionally stable, resistant to chemical attack and of high optical quality, it is, alone, relatively hydrophobic and does not lend itself readily to hydrolysis. However, by the addition to CR39 of controlled amounts of one or more vinyl-type monomers such as maleic anhydride or glycidyl methacrylate containing groups such as anhydride and epoxide respectively that open to hydroxyl or carboxyl groups in hydrolysis, the resultant composition when cast and cured by the application of controlled heat will be relatively surface-hydrolizable when immersed in an alkaline solution and thereby rendered hydrophilic.

In FIG. 4 there is shown a container 52 having an alkaline solution 54 therein into which the lens 10 when finished as shown in FIG. 2 or alternatively finished as shown and described above with relation to FIGS. 5–10 is immersed for hydrolysis as will be described in detail hereinafter. It has been found that a desirable casting composition would consist of from 40% to 99% CR39 and 1% to 60% of one or more of the above-mentioned vinyl-type monomers. However, the proportion of ingredients of the casting composition and subsequent time cycles and concentration of hydrolyzing solutions must be carefully controlled in accordance with the particular vinyl-type monomer used to render the ultimate product desirably characterized as to hardness, stability and wettability.

Examples of suitable compositions and their subsequent treatment which is required to achieve the desired end product of this invention are as follows:

*Example 1*

*Casting composition*: 90% to 99% CR39 and 1% to 10% maleic anhydride.
*Curing cycle*: 2 to 17 hours at temperatures ranging from 45° to 100° C.
*Surface hydrolyzed by immersion in*: 1 to 20% alkaline solution selected from the group consisting of sodium hydroxide, sodium carbonate, potassium hydroxide, sodium acetate, sodium borate, tri-sodium phosphate or mixtures thereof for a time period of from 1 to 30 minutes with the solution temperatures ranging from 70° to 150° F.

*Example 2*

*Casting composition*: 50% to 95% CR39 and 5% to 50% glycidyl methacrylate.
*Curing cycle*: 2 to 17 hours at temperatures ranging from 45° to 100° C.
*Surface hydrolyzed by immersion in*: 1% to 20% alkaline solution selected from the group consisting of sodium hydroxide, sodium carbonate, potassium hydroxide, sodium acetate, sodium borate, tri-sodium phosphate, or mixtures thereof for a time period of from 15 minutes to 24 hours with the solution temperatures ranging from 70° to 150° F.

Specific casting compositions and their subsequent treatment may consist of the following:

(1) A casting composition consisting of 90% CR39 and 10% maleic anhydride cured for approximately 17 hours at a temperature graduated from 44° to 105° C. during said 17 hours and thereafter surface hydrolyzed by immersion in a 10% sodium hydroxide solution for approximately 1 minute with the solution approximately at room temperature.

(2) A casting composition consisting of 50% CR39 and 50% glycidyl methacrylate cured for approximately 17 hours at a temperature graduated from 44° C. to 105° C. during said 17 hours and thereafter surface hydrolyzed by immersion in a 10% sodium hydroxide solution for approximately 15 minutes with said solution at approximately room temperature.

It is pointed out that the curing time cycles may be varied in accordance with the temperatures used. That is, if relatively high temperatures are used, the time cycle is shortened and vice versa. Further, the hydrolyzing time cycles are dependent upon the chemical composition of the material to be hydrolyzed, the temperature of the solution and its concentration, which factors are variable. The examples given above are for purposes of illustration only.

It is further pointed out that the above given examples of casting compositions are but a few of the many copolymers which may be used in accordance with this invention. Moreover, various multipolymer compositions using CR39 and more than one vinyl-type monomer at least one of which contains hydrophilic groups may be used. For example, a mixture of CR39 and methyl methacrylate would be relatively difficult to hydrolyze. However, by the addition to the CR39 and methyl methacrylate of a relatively small percentage of maleic anhydride, a relatively easily hydrolyzable tripolymer is formed wherein the maleic anhydride renders the composition more readily hydrolyzable.

As an example, such a tripolymer may consist of from 40% to 70% CR39, 30% to 60% methyl methacrylate and 1% to 10% maleic anhydride cured by the application of heat ranging from 45° to 100° C. for a time period of from 2 to 17 hours. Surface hydrolyzation of the cured product would be accomplished by immersion thereof in a 1% to 20% alkaline solution selected from the group consisting of sodium hydroxide, sodium carbonate, potassium hydroxide, sodium acetate, sodium borate, trisodium phosphate or mixtures thereof for a time period of from 15 minutes to 24 hours with the solution ranging from 70° to 150° F.

A useful tripolymer of this type would embody a composition of approximately 40% CR39, 57% methyl methacrylate and 3% maleic anhydride cured for 17 hours at a graduated temperature of approximately from 44° C. to 105° C. and hydrolyzed by immersion in a 10% sodium hydroxide for approximately 15 minutes with the sodium hydroxide solution at a temperature ranging from 70° to 150° F.

Following the alkaline hydrolysis of the lens 10 surfaces, the said lens is ready for immediate use. That is, as mentioned above, the lens is completely finished to its final shape before being surface hydrolyzed. By rendering the lens 10 surfaces hydrophilic as outlined above, increased comfort and longer wearing periods can be enjoyed by the user thereof without danger of irritation or damage to the corneal or other eye tissues since continual wetting of the lens will be accomplished directly by the eye secretions as a result of the affinity of the lens surfaces to said secretions.

From the foregoing, it can be seen that an improved, simplified and economical process, and article resulting therefrom, has been provided for accomplishing all of the objects and advantages of the invention. Nevertheless, it should be apparent that many changes in the details and steps of the process may be made without departing from the spirit of the invention as expressed in the accompanying claims and the invention is not to be limited to the exact matters shown and described as only the preferred matters have been given by way of illustration.

Having described my invention, I claim:

1. The method of forming a contact lens which is adapted to be worn in direct contact with the eye of a patient and which is dimensionally and physically stable and of high optical quality comprising forming a composition of from 40% to 99% allyldiglycolcarbonate, 1% to 60% of a monomer selected from the group consisting of maleic anhydride and glycidyl methacrylate, curing the material of said composition by subjecting the same to temperatures ranging from 44° C. to 105° C. for a time cycle of from 2 to 17 hours and at one stage of said method forming said composition to the desired shape of said lens with finished optical surfaces on the opposed sides thereof of controlled related curvatures and thereafter exposing said optical surfaces to an alkaline solution of from 1% to 20% of a material selected from the group consisting of sodium hydroxide, sodium carbonate, potassium hydroxide, sodium acetate, sodium borate, trisodium phosphate and mixtures thereof for a time period of from 1 to 30 minutes at temperatures ranging from 70° F. to 150° F. to render such surfaces hydrophilic.

2. The method of forming a contact lens which is adapted to be worn in direct contact with the eye of a patient and which is dimensionally and physically stable and of high optical quality comprising forming a casting composition of from 40% to 99% allyldiglycolcarbonate and from 1% to 60% of a monomer selected from the group consisting of maleic anhydride and glycidyl methacrylate, casting the material of said composition to the finished size and shape desired of the contact lens and with finished optical surfaces on the opposed sides thereof of controlled related curvatures, curing said cast material by subjecting the same to temperatures ranging from 44° C. to 105° C. for a time cycle of from 2 to 17 hours and thereafter subjecting said shaped material to an alkaline solution of from 1% to 20% of a material selected from the group consisting of sodium hydroxide, sodium carbonate, potassium hydroxide, sodium acetate, sodium borate, tri-sodium phosphate and mixtures thereof for a time period of from 1 to 30 minutes at temperatures ranging from 70° F. to 150° F. to render such surfaces hydrophilic.

3. The method of forming a contact lens which is adapted to be worn in direct contact with the eye of a patient and which is dependable as to dimensional and physical stability and of high optical quality comprising forming a composition consisting of from 40% to 99% allyldiglycolcarbonate, 1% to 60% of a monomer selected from the group consisting of maleic anhydride and glycidyl methacrylate, curing the material of said composition by subjecting the same to temperatures ranging from 44° C. to 105° C. for a time cycle of from 2 to 17 hours to solidify said material, shaping said solidified material to the desired configuration of the contact lens and optically finishing opposite sides thereof, exposing said sides of said contact lens to an alkaline solution of from 1% to 20% of a material selected from the group consisting of sodium hydroxide, sodium carbonate, potassium hydroxide, sodium acetate, sodium borate, tri-sodium phosphate and mixtures thereof for a time period of from 1 to 30 minutes at temperatures ranging from 70° to 150° F. to render said sides of said contact lens hydrophilic.

4. The method of forming a contact lens which is adapted to be worn in direct contact with the eye of a patient and which is dependable as to dimensional and physical stability and of high optical quality comprising forming a solution consisting of from 90% to 99% allyldiglycolcarbonate and from 1% to 10% of maleic anhydride, curing the material of said solution by subjecting the same to temperatures ranging from 45° to 100° C. for a time cycle of from 2 to 17 hours and at one stage of said method forming said material to the desired shape and with finished optical surfaces on the opposed sides thereof of controlled related curvatures and thereafter subjecting said shaped material to an alkaline solution of from 1% to 20% of a material selected from a group consisting of sodium hydroxide, sodium carbonate, potassium, hydroxide, sodium acetate, sodium borate, tri-sodium phosphate and mixtures thereof for a time period of from 1 to 30 minutes at temperatures ranging from 70° F. to 150° F. to render the surfaces of said lens hydrophilic without altering its dimensional and physical characteristics.

5. The method of forming a contact lens which is adapted to be worn in direct contact with the eye of a patient and which is dependable as to dimensional and physical stability and of high optical quality comprising forming a solution consisting of from 50% to 95% allyldiglycolcarbonate and from 5% to 50% of glycidyl methacrylate, curing the material of said solution by subjecting the same to temperatures ranging from 44° to 105° C. for a time cycle of from 2 to 17 hours and at one stage of said method forming said material to the desired shape and with finished optical surfaces on the opposed sides thereof of controlled related curvatures and thereafter subjecting said shaped material to an alkaline solution of from 1% to 20% of a material selected from a group consisting of sodium hydroxide, sodium carbonate, potassium hydroxide, sodium acetate, sodium borate, tri-sodium phosphate and mixtures thereof for a time period of from 1 to 30 minutes at temperatures ranging from 70° F. to 150° F. to render the surfaces of said lens hydrophilic without altering its dimensional and physical characteristics.

6. The method of forming a contact lens which is adapted to be worn in direct contact with the eye of a patient and which is dependable as to dimensional and physical stability and of high optical quality comprising forming a solution consisting of approximately 90% allyldiglycolcarbonate and approximately 10% maleic anhydride, curing the material of said solution for approximately 17 hours at temperatures graduated from 44° C. to 150° C. during said 17 hours and at one stage of said method forming said material to the desired shape and with finished optical surfaces on the opposed sides thereof of controlled related curvatures and thereafter subjecting said shaped material to an alkaline solution of approximately 10% sodium hydroxide for a time period of approximately 1 minute at approximately room temperature to render the surfaces of said lens hydrophilic without altering its dimensional and physical characteristics.

7. The method of forming a contact lens which is adapted to be worn in direct contact with the eye of a patient and which is dependable as to dimensional and physical stability and of high optical quality comprising forming a solution consisting of approximately 50% allyldiglycolcarbonate and approximately 50% glycidyl methacrylate, curing the material of said solution for approximately 17 hours at temperatures graduated from 44° C. to 105° C. during said 17 hours and at one stage of said method forming said material to the desired shape and with finished optical surfaces on the opposed sides thereof of controlled related curvatures and thereafter subjecting said shaped material to an alkaline solution of approximately 10% sodium hydroxide for a time period of approximately 15 minutes at approximately room temperature to render the surfaces of said lens hydrophilic without altering its dimensional and physical characteristics.

8. A contact lens which is adapted to be worn in direct contact with the eye having at least one hydrophilic side surface thereon, said lens comprising a heat cured copolymer of high optical quality and dimensional and physical stability having finished optical surfaces of controlled related curvatures on opposite sides thereof and being of the size and shape desired of said lens, said copolymer consisting of from 40% to 99% allyldiglycolcarbonate and from 1% to 60% of a monomer selected from the group consisting of maleic anhydride having an anhydride converted to carboxyl and glycidyl methacrylate containing an epoxide converted to hydroxyl at said side surface of said lens thereby rendering said side surface hydrophilic.

9. A contact lens which is adapted to be worn in direct contact with the eye having at least one hydrophilic side surface thereon, said lens comprising a heat cured copolymer of high optical quality and dimensional and physical stability having finished optical surfaces of controlled related curvatures on opposite sides thereof, and being of the size and shape desired of said lens, said copolymer consisting of from 40% to 99% allyldiglycolcarbonate and from 1% to 60% maleic anhydride having an anhydride converted to carboxyl at said side surface of said lens thereby rendering said side surface hydrophilic.

10. A contact lens which is adapted to be worn in direct contact with the eye having at least one hydrophilic side surface thereon, said lens comprising a heat cured copolymer of high optical quality and dimensional and physical stability having finished optical surfaces of controlled relating curvatures on opposite sides thereof and being of the size and shape desired of said lens, said copolymer consisting of from 40% to 99% allyldiglycolcarbonate and from 1% to 60% glycidyl methacrylate having an epoxide converted to hydroxyl at said side surface of said lens thereby rendering said side surface hydrophilic.

11. A contact lens which is adapted to be worn in direct contact with the eye having at least one hydrophilic side surface thereon, said lens comprising a heat cured copolymer of high optical quality and dimensional and physical stability having finished optical surfaces of controlled related curvatures on opposite sides thereof and being of the size and shape desired of said lens, said copolymer consisting of approximately 90% allyldiglycolcarbonate and approximately 10% maleic anhydride having an anhydride converted to carboxyl at said side surface of said lens thereby rendering said side surface hydrophilic.

12. A contact lens which is adapted to be worn in direct contact with the eye having at least one hydrophilic side surface thereon, said lens comprising a heat cured copolymer of high optical quality and dimensional and physical stability having finished optical surfaces of controlled related curvatures on opposite sides thereof and being of the size and shape desired of said lens, said copolymer consisting of approximately 50% allyldiglycolcarbonate and approximately 50% glycidyl methacrylate containing an epoxide converted to hydroxyl at said side surface of said lens thereby rendering said side surface hydrophilic.

References Cited by the Examiner

UNITED STATES PATENTS

| | | | |
|---|---|---|---|
| 2,404,422 | 7/1946 | Andersen | 117—118 |
| 2,479,522 | 8/1949 | Strain | 260—77.5 |
| 2,524,432 | 10/1950 | Dorough | 260—89.5 |
| 2,565,147 | 8/1951 | Pfluger | 260—78.5 |
| 2,580,901 | 1/1952 | Erickson et al. | 260—77.5 |
| 2,701,245 | 2/1955 | Lynn | 260—77.5 |
| 2,892,736 | 6/1959 | Johnson et al. | 260—78.5 |
| 2,910,456 | 10/1959 | Gooreynd et al. | 260—77.5 |
| 2,964,501 | 12/1960 | Sarofeen | 260—77.5 |

FOREIGN PATENTS

| | | |
|---|---|---|
| 1,065,621 | 9/1959 | Germany. |
| 818,471 | 8/1959 | Great Britain. |
| 847,797 | 9/1960 | Great Britain. |

ALEXANDER H. BRODMERKEL, *Primary Examiner*

MILTON STERMAN, HAROLD N. BURSTEIN, LEON J. BERCOVITZ, ROBERT F. WHITE, *Examiners.*